United States Patent
Werberich (10) Patent No.: US 11,222,446 B2
(45) Date of Patent: Jan. 11, 2022

(54) VIRTUAL FACE CHART

(71) Applicant: PRÊT-À-TEMPLATE CRIAÇÃO E COMERCIALIZAÇÃO DE SOFTWARE DE MODA LTDA., Lajeado (BR)

(72) Inventor: Bruno Rocha Werberich, Porto Alegre (BR)

(73) Assignee: PRÊT-À-TEMPLATE CRIAÇÃO E COMERCIALIZAÇÃO DE SOFTWARE DE MODA LTDA., Lajeado (BR)

(*) Notice: Subject to any disclaimer, the term of this patent is extended or adjusted under 35 U.S.C. 154(b) by 0 days.

(21) Appl. No.: 17/026,185

(22) Filed: Sep. 19, 2020

(65) Prior Publication Data

US 2021/0090304 A1    Mar. 25, 2021

Related U.S. Application Data

(60) Provisional application No. 62/902,596, filed on Sep. 19, 2019.

(51) Int. Cl.
| | |
|---|---|
| *G06T 11/00* | (2006.01) |
| *G06T 15/00* | (2011.01) |
| *G06T 15/50* | (2011.01) |
| *G06T 11/40* | (2006.01) |

(52) U.S. Cl.
CPC ........ *G06T 11/001* (2013.01); *G06T 2200/24* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0129738 A1* | 6/2008 | Kim | ........................ | G06T 15/04 345/473 |
| 2012/0090304 A1* | 4/2012 | Kotrba | .................. | F01N 3/0211 60/301 |
| 2015/0072318 A1* | 3/2015 | Fidaleo | ................ | A45D 44/005 434/100 |
| 2018/0075524 A1* | 3/2018 | Sartori Odizzio | . | G06Q 30/0643 |
| 2018/0225845 A1* | 8/2018 | Aarabi | ............... | G06K 9/00604 |
| 2020/0019041 A1* | 1/2020 | Moltaji | .................... | G06T 17/20 |
| 2020/0027744 A1* | 1/2020 | Aarabi | ...................... | G03F 7/70 |

\* cited by examiner

*Primary Examiner* — Wesner Sajous
(74) *Attorney, Agent, or Firm* — B. Aaron Schulman, Esq.; Stites & Harbison, PLLC (57) ABSTRACT

This document describes the development of a digital Face on virtual canvas (computer, smartphones and tablets) that can simulate the application of makeup products. The developed tool allows a user to test products and create new makeup techniques for be used by professional and makeup lovers.

11 Claims, 7 Drawing Sheets

| $X_{0,0}, Y_{0,0}, Z_{0,0}$ | $X_{1,0}, Y_{1,0}, Z_{1,0}$ | $X_{2,0}, Y_{2,0}, Z_{2,0}$ |
|---|---|---|
| $X_{0,1}, Y_{0,1}, Z_{0,1}$ | $X_{1,1}, Y_{1,1}, Z_{1,1}$ | $X_{2,1}, Y_{2,1}, Z_{2,1}$ |
| $X_{0,2}, Y_{0,2}, Z_{0,2}$ | $X_{1,2}, Y_{1,2}, Z_{1,2}$ | $X_{2,2}, Y_{2,2}, Z_{2,2}$ |

VIRTUAL FACE CHART

FIELD OF THE INVENTION

The present disclosure generally relates to methods, systems, and devices for generating an image of a surface with different materials applied thereto. More specifically, the present disclosure relates to a computer implemented method for creating a digital face chart, to simulate the application of makeup products on a human face.

BACKGROUND

Makeup artists often use face charts to test ideas, explore their creativity, and to create a portfolio of their work. A face chart can be a piece of paper with a face on it, on which the artist may then directly apply actual makeup products. However, such techniques are inefficient as they are costly in terms of paper and makeup, and as they don't allow for the easy correction of errors.

Current digital solutions for face charts suffer from other shortcomings, most notably the inability to simulate different light effects on makeup, the inability to faithfully and realistically represent the properties of different makeup materials, and the effects obtained when different makeup materials are mixed together or applied on top of each other. In particular it has been found that without a well-defined light reaction for a particular makeup product, this makeup product cannot be realistic represented.

The present disclosure provides a system, method, and device for creating virtual face charts which overcome these and other deficiencies.

DETAILED DESCRIPTION

According to one aspect, the present disclosure is directed to a method on a computing device for digitally representing an image representing the application of complex materials on a surface, comprising maintaining, in a memory of the computing device, a normal map, the normal map comprising a two-dimensional array of normal vectors; maintaining, in the memory of the computing device, a diffuse color layer, the diffuse color layer comprising a first two-dimensional array of colors; maintaining, in the memory of the computing device, a specular color layer, the specular color layer comprising a second two-dimensional array of colors; for every point of the surface: computing a diffuse light intensity based on the normal map at the point; computing a specular light intensity based on the normal map at the point; computing a color for the point by adding the diffuse color for the point multiplied by the diffuse light intensity and the specular color for the point multiplied by the specular light intensity; and displaying the color on pixels of a display of the computing device corresponding to the point.

According to another aspect, the present disclosure is directed to a computing device, comprising: memory; a display; a processor; wherein the processor, the memory, and the display cooperate to: maintain, in the memory, a normal map, the normal map comprising a two-dimensional array of normal vectors; maintain, in the memory, a diffuse color layer, the diffuse color layer comprising a first two-dimensional array of colors; maintain, in the memory, a specular color layer, the specular color layer comprising a second two-dimensional array of colors; for every point of the surface: compute a diffuse light intensity based on the normal map at the point; compute a specular light intensity based on the normal map at the point; compute a color for the point by adding the diffuse color for the point multiplied by the diffuse light intensity and the specular color for the point multiplied by the specular light intensity; display the color on pixels of the display corresponding to the point.

According to yet another aspect, the present disclosure is directed to a non-transitory computer-readable medium having stored thereon executable code for execution by a processor of a computing device, the executable code comprising instructions for: maintaining, in a memory of the computing device, a normal map, the normal map comprising a two-dimensional array of normal vectors; maintaining, in the memory of the computing device, a diffuse color layer, the diffuse color layer comprising a first two-dimensional array of colors; maintaining, in the memory of the computing device, a specular color layer, the specular color layer comprising a second two-dimensional array of colors; for every point of the surface: computing a diffuse light intensity based on the normal map at the point; computing a specular light intensity based on the normal map at the point; computing a color for the point by adding the diffuse color for the point multiplied by the diffuse light intensity and the specular color for the point multiplied by the specular light intensity; displaying the color on pixels of a display of the computing device corresponding to the point.

Figure 1:
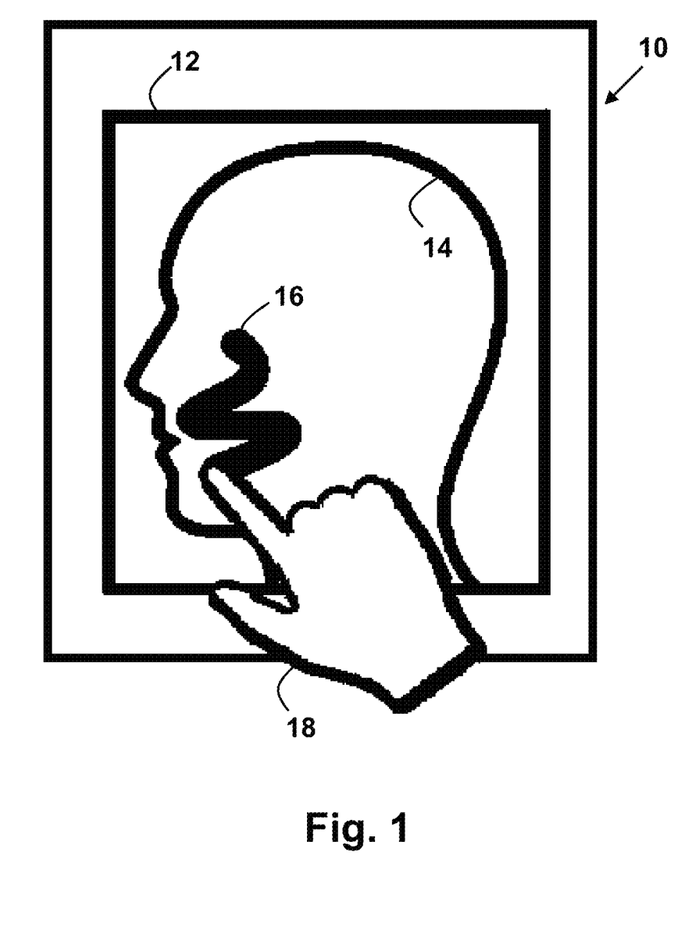
FIG. 1 is a simplified illustration of a device according to at least one embodiment of the present disclosure.

Reference is now made to FIG. 1, in which an exemplary device for practicing the present disclosure is shown. In the example of FIG. 1, the device 10 is a tablet type device, but the present disclosure is not limited to tablets and other types of computing devices may be used. For example, the present disclosure may be practiced on a desktop computer, laptop computer, smart phone, gaming console, amongst others.

The device 10 comprises a display 12, on which an outline of a human face 14 is displayed. In the example of FIG. 1, the face displayed is shown from a side view, but other views are within the scope of the present disclosure.

According to at least some embodiments, a user may select from a plurality of faces on a user interface element. The plurality of faces may include different head shapes, different skin tones, and different views, amongst other options.

A user may apply virtual makeup on the face 14 using a finger 18 (if the display is a touch-screen) or other user interface elements, such as for example a cursor controlled by a mouse, or the like.

Makeup products have very complex optical properties. Their virtual rendering requires the representation of matte, creamy, metallic, and glossy material, among others. These materials can be in powder, glitter, stick or liquid form. Each makeup product may further be a heterogeneous blend of the characteristics described above. As exemplified in FIG. 2, a virtual face chart according to the present disclosure may contain different types of textures that can be used by the user.

Figure 2:
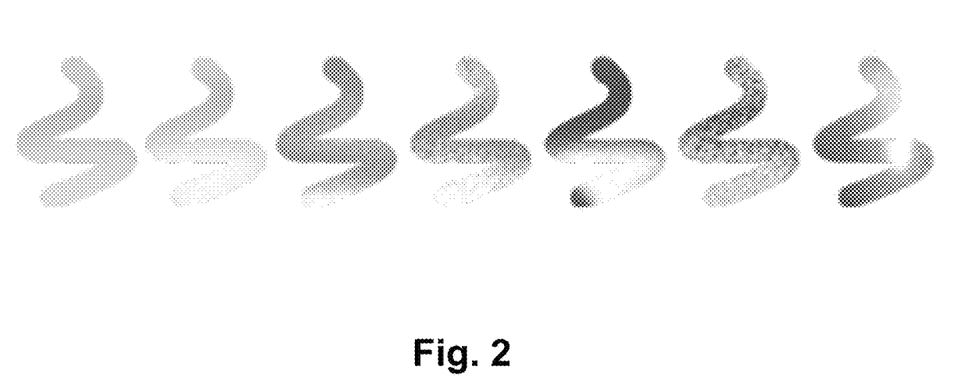
FIG. 2 is an illustration of different materials according to at least one embodiment of the present disclosure.

Specifically, FIG. 2 shows a plurality of different exemplary textures which may be used in accordance with the present disclosure.

The present disclosure improves upon the prior art by faithfully representing different makeup materials when exposed to different types of lighting.

Returning to FIG. 1, the virtual canvas or display 12 is receiving a user-applied material 16. The user-applied material, or virtual makeup 16 is processed in several different layers. Layers process lighting properties, colors, textures, and face volumes, as will be described in greater detail below.

According to at least some embodiments of the present disclosure, materials are digitally represented by layers, with each layer conveying relevant information for rendering the virtual face chart. In at least some embodiments, a virtual face chart comprises three layers: the diffuse color layer, the specular color layer, and the normal map. In at least some embodiments, the normal map is initialized to represent the texture of human skin. These layers shall be described in greater detail below.

The graphical representation of different makeup products is assisted by the combination of several parameters, defined for different makeup products. These parameters define how application of the makeup product in a particular area affects each layer for that given area.

A user need not be aware of the layer structure of the virtual face chart. The layers are used to faithfully represent the appearance of complex materials on a display, and do not increase the complexity of using a virtual face chart.

According to at least one embodiment of the present disclosure, a virtual face chart is represented digitally by three layers. Each layer comprises a two-dimensional array where each cell of the array corresponds to a point to be displayed. In each cell of the normal map, there is a normal vector indicating the orientation of the surface at the corresponding point. In each cell of the diffuse color layer, there is a color, and in each cell of the specular color layer, there is a color.

When a user applies makeup material to a region of the virtual face chart, data in each of the layer may be modified according to the properties of the makeup material being applied. Several examples will be described below. The virtual face chart is displayed to a screen using information from all three layers, thereby providing a complex and faithful representation of the appearance of all the makeup product applied to the virtual face chart.

The visual effect of makeup materials is intrinsically related to the properties of the surface to which they are applied. In the digital face chart, a drawing represents the human face, and the shape and texture of the skin is represented by normal mapping of the face surface.

Normal mapping is a technique which allows to realistically represent lighting effects around bumps and dents on a surface, and is widely used in 3-dimensional computer graphics. To calculate the Lambertian (diffuse) lighting of a surface, the dot product of the unit vector from the shading point to the light source and the unit vector normal to the surface is computed. The result is the intensity of the light on that surface.

Therefore, the diffuse color intensity at a given point depends only on the light direction and the surface orientation. When light is shining at 90 degrees on a surface, the dot product is 1, producing maximum light intensity. When light is shining at an angle other than 90 degrees, the dot product will be less than 1 and the light intensity will be less than the maximum, thereby producing a darker color.

Figure 3:
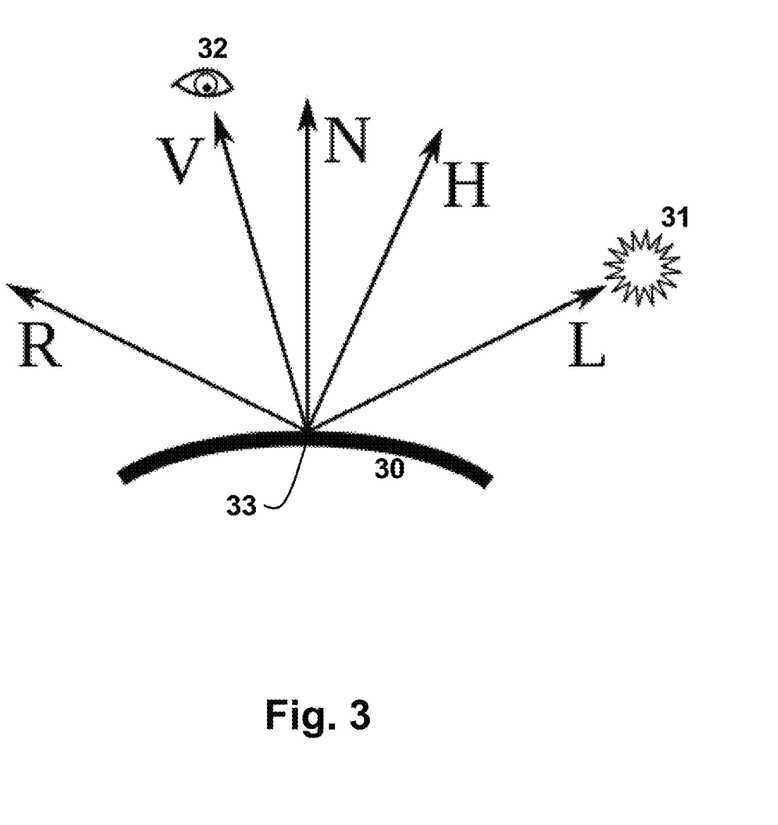
FIG. 3 is a simplified diagram illustrating how specular color is computed according to at least one embodiment of the present disclosure.

The specular color intensity is computed based on an additional factor, namely the observer's point of view. Reference is now made to FIG. 3.

In FIG. 3, a surface 30 is illuminated by light source 31, and observed by observer 32. N is the normal vector at point 33, L is a vector directed towards the light source 31 from point 33, and V is a vector directed towards the observer 32 from point 33. R is a vector showing light reflection as it reflects on point 33 from light source 31. H is defined as a vector halfway between L and V.

To calculate the specular color intensity, the dot product of the vectors N and H is computed as:

$$D = N \cdot H$$

The specular color intensity is then calculated as:

$$I_{specular} = D^S$$

where S is a parameter representing specular hardness. S may be predetermined or its value calibrated.

According to at least one embodiment of the present disclosure, the position of the observer is deemed to be constant, centered on the screen, at a fixed distance.

A polygonal model of a human face can only approximate the shape of the surface. The present disclosure overcomes this deficiency by using a 3-channel bitmap textured across the model. Each pixel may therefore be associated with a normal vector in three dimensions, with each channel in the bitmap containing a spatial dimension (X, Y, or Z). This allows more detailed normal vector information to be encoded, and to represent the skin texture more realistically.

Figure 4:
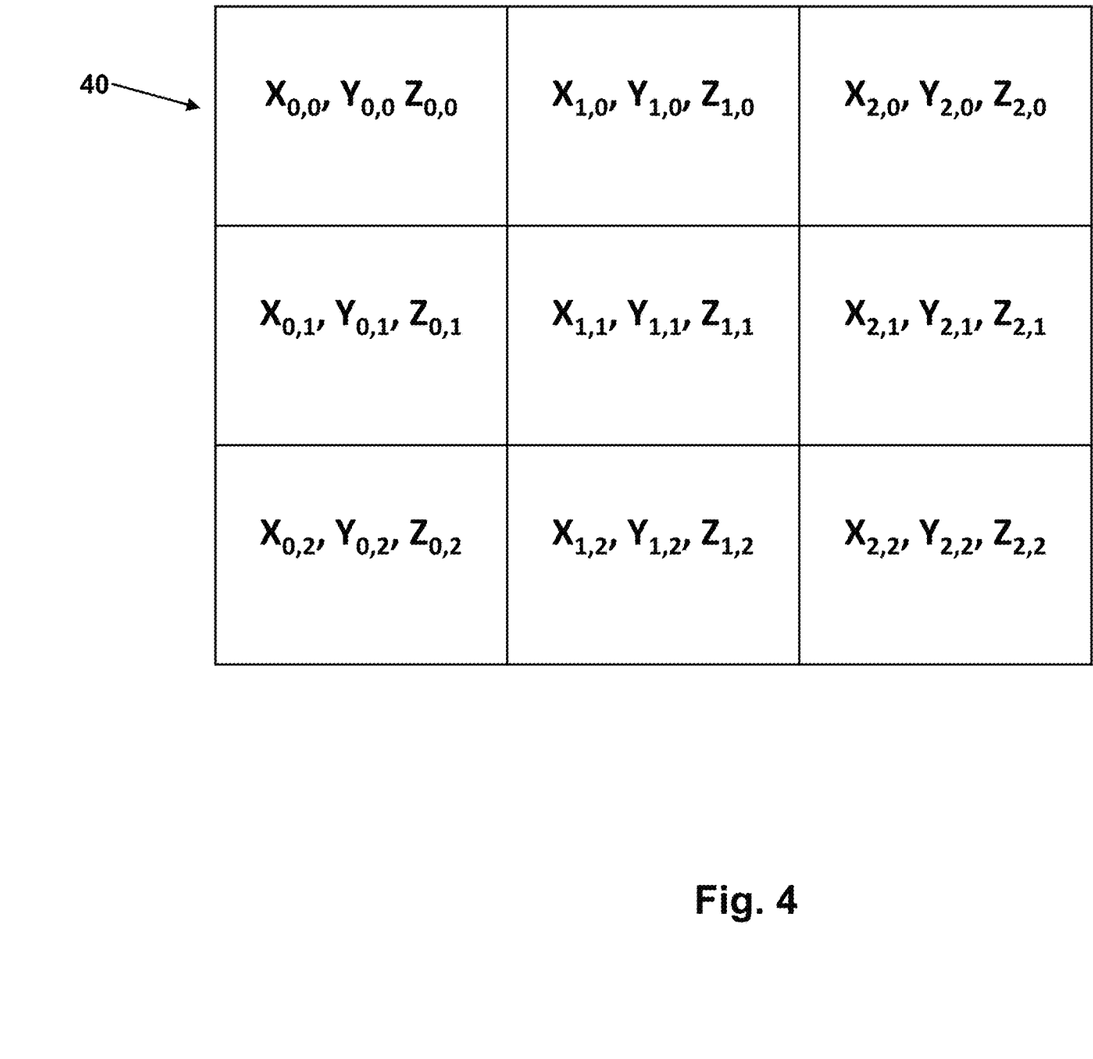
FIG. 4 is an illustration of a three-channel bitmap according to at least one embodiment of the present disclosure.

For example, as illustrated in FIG. 4, a two-dimensional bitmap is shown in which each cell of the table 40 corresponds to a pixel. As shown in FIG. 4, each pixel is addressed by two coordinates i and j. Each pixel is associated to three coordinates indicating a normal vector for the pixel. The normal vector has 3 coordinates X, Y, and Z. According to the notation used in FIG. 4 a pixel at coordinate ij has a vector defined by $X_{i,j}$, $Y_{i,j}$, and $Z_{i,j}$.

This technique adds much more detail to a model's surface, especially in conjunction with advanced lighting techniques. Since the normal map is an image that contains a normal vector on the drawing surface for each pixel on the canvas, once the observer and the light source's position is known, it becomes possible to calculate the incidence of light and reflexivity for each pixel. The normal map is thus used to estimate diffuse and specular illumination for each pixel. However, some materials have characteristics that overlap the surface relief, such as glitters, gloss, and concealers.

Display of the virtual canvas therefore computes a specular color intensity and a diffuse color intensity for every point on the virtual canvas or alternatively for every pixel being displayed. The color for a given point i,j is then given by the formula:

$$C(i,j) = I_{diffuse}(i,j) C_{diffuse}(i,j) + I_{specular}(i,j) C_{specular}(i,j)$$

where $C(i,j)$ is the color value for point i,j, $I_{diffuse}(i,j)$ is the diffuse color intensity for point i,j, $C_{diffuse}(ij)$ is the value in the diffuse color layer for point i,j, $I_{specular}(i,j)$ is the specular color intensity for point i,j, and $C_{specular}(i,j)$ is the value in the specular color layer for point i,j.

Glitter is a solid particle found mixed in several products, which may also be applied independently. Glitter consists of several facets, usually circular, deposited randomly on the surface, dispersing, and reflecting the incident light. The application of this material is simulated according to the present disclosure by applying the solid color of the glitter in question to the diffused lighting color layer. The specular color layer is colored white to intensify the shine.

The normal map is populated with small circular shapes of random orientation, generating facets on the surface that disperse the incident light. The scattering of light on the surface causes several light points, a common effect of the material. This is illustrated with respect to FIG. 5.

Figure 5:
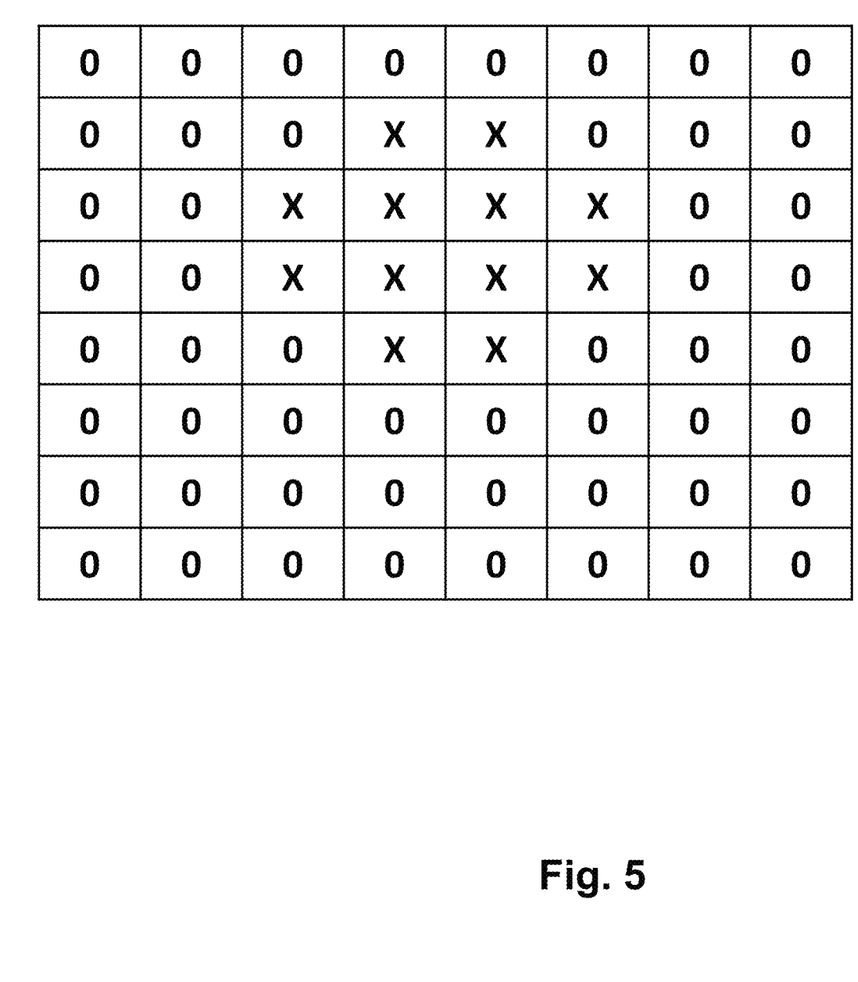
FIG. 5 is a block diagram of an exemplary device according to at least one embodiment of the present disclosure.

Specifically, in FIG. 5 a bitmap like the bitmap of FIG. 4 is shown. Most of the pixels are marked with an O to indicate the normal vector for these pixels prior to the application of glitter. When a glitter particle is placed, a group of pixels defining a circle are designated, and a random orientation is selected. The normal vector for the designated pixels is changed to the selected orientation. In the bitmap of FIG. 5, the designated pixels are marked with an X.

According to at least one embodiment of the present disclosure, foundation is represented by applying the solid color of the product to the diffused lighting color layer. The specular color layer receives a lighter shade for a smooth, dull lighting effect.

According to at least one embodiment of the present disclosure, illuminator is represented by applying the solid color of the product to the diffused lighting color layer. The specular color layer is colored white to intensify the shine. The normal map is populated with random noise to mimic small faceted particles, which glow when reflecting the incident light.

According to at least one embodiment of the present disclosure, powder is represented by applying a low opacity brush, making it possible to intensify its tone with several overlapping applications. The product attenuates the specular lighting effect, reducing the glare in the applied region. It may contain glitter in its composition, being used at the same time.

Gloss is a watery product that maintains its aspect after application, produces a high level of light reflection in the applied area, may be colored or not, and may contain particles of glitter. Concealer is a creamy liquid that which remains opaque when applied to the skin. Both gloss and concealer soften face surface imperfections. Gloss produces a wet-like effect, like a liquid layer with a smooth surface. Although not a shiny material, the concealer fills the pores and imperfections of the skin with a matte finish. According to at least one embodiment of the present disclosure, these materials are digitally represented by setting the normal vectors of an area where they are applied to an average of the normal vectors of the surroundings. This creates the effect of making the surface appear realistically smooth.

According to at least one embodiment of the present disclosure, blush is digitally represented by applying a low opacity brush, making it possible to intensify the product's tone with several overlapping applications. It may contain glitter in its composition, being applied concurrently.

According to at least one embodiment of the present disclosure, eye and mouth pencils are digitally represented by applying a fine, grainy brush (similar to the scratch of a pencil). It uses a diffused lighting color layer with a solid color to colorize the brush. Kajal may be similarly represented by using a fine grainy brush. Colors are defined in the diffused lighting color layer with solid color and the specular color layer with a lighter shade with a slightly wet finish.

According to at least one embodiment of the present disclosure, lipstick cream is digitally represented by applying a solid color of the product to the diffused lighting color layer in the areas where it is applied. The specular color layer receives a much lighter tone which produces a wet glow lighting effect. Lipstick matte may be digitally represented by applying the solid color of the product to the diffused lighting color layer. The specular color layer receives a lighter shade for a smooth, dull lighting effect. Lipstick frosty may be digitally represented by applying a solid color of the product to the diffuse color layer and applying a complementary tone, with great emphasis on the specular color. Random noise is added to the normal map to obtain the effect of metallic particles.

According to at least some embodiments of the present disclosure, shadow may be digitally represented by applying a low opacity brush, making it possible to intensify the product's tone with several overlapping applications. It may contain glitter in its composition, being applied concurrently.

According to at least some embodiments of the present disclosure, outliner may be digitally represented by applying a continuous fine line brush, with variable thickness (being thinner at the beginning and end of the line). The solid color of the product is applied to the diffuse color layer.

Figure 6:
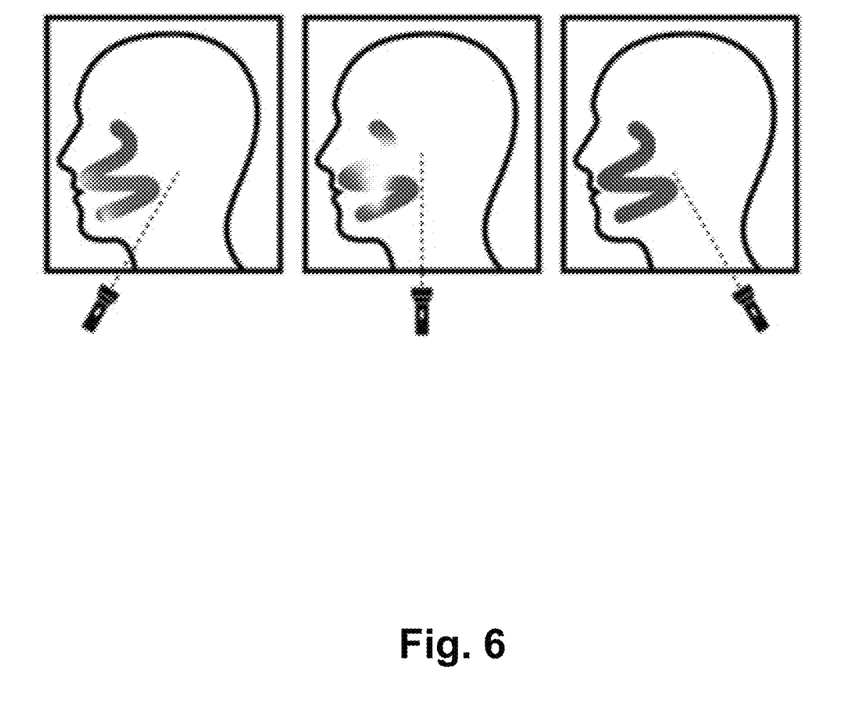
FIG. 6 is an illustration of how different light position affects the appearance of a virtual face chart according to at least one embodiment of the present disclosure.

Makeup products react to variations in lighting intensity and direction, as shown in FIG. 6. According to at least some embodiments of the present disclosure, if the device on which the virtual face chart is being run comprises an accelerometer or gyroscope, these may be used to estimate different angles of light incidence. This is performed by using the angle provided by the accelerometer or gyroscope, as the angle from which light is illuminating the virtual face chart in the calculations for diffuse light intensity and specular light intensity described above.

Figure 7:
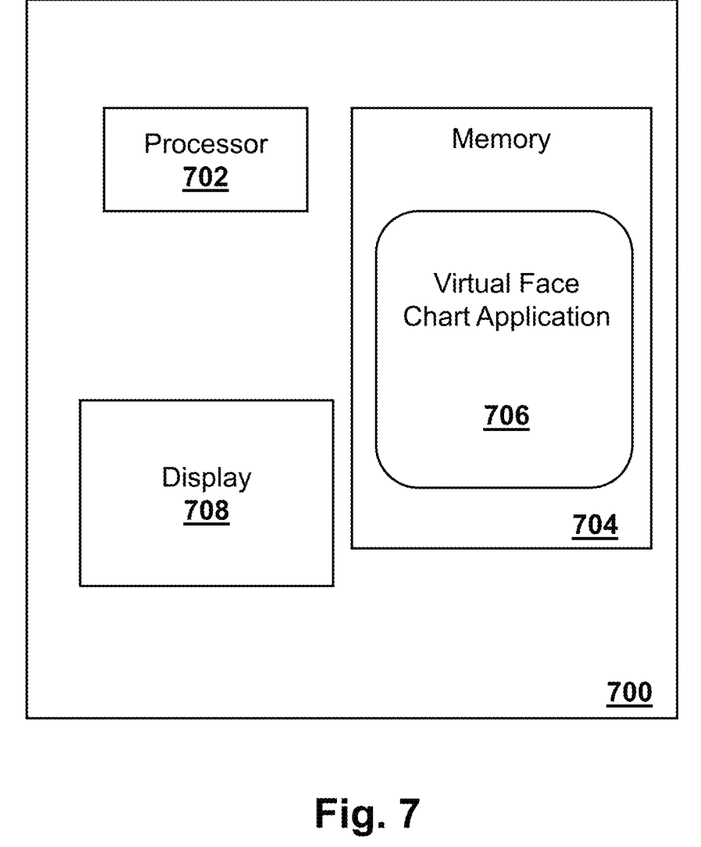
FIG. 7 is a simplified diagram of a computing device according to at least one embodiment of the present disclosure.

Reference is now made to FIG. 7 which illustrates an exemplary device that can be used to practice the above disclosure according to at least one embodiment. Device 700 comprises a processor 702, a memory 704, and a display 708. Memory 704 comprises a face chart application 706. In at least some embodiments, display 708 is a touch screen, allowing a user to provide input directly by touching the screen with a finger. Alternatively, if display 708 is not a touch screen, another input device such as a mouse may be used.

I claim:

1. A method on a computing device for digitally representing an image representing the application of complex materials on a surface, said surface comprising a plurality of points on said surface that can be illuminated by a light source, said method comprising:

maintaining, in a memory of the computing device, a normal map, the normal map comprising a two-dimensional array of normal vectors;

maintaining, in the memory of the computing device, a diffuse color layer, the diffuse color layer comprising a first two-dimensional array of colors;

maintaining, in the memory of the computing device, a specular color layer, the specular color layer comprising a second two-dimensional array of colors;

illuminating said surface with a light source, and for each point of the plurality of points on said surface:

computing a diffuse light intensity based on the normal map at each point;

computing a specular light intensity based on the normal map at each point;

computing a color for each point by adding the diffuse color for each point multiplied by the diffuse light intensity and the specular color for each point multiplied by the specular light intensity;

displaying the color on pixels of a display of the computing device corresponding to each point on said surface so as to obtain a digital representation of an image representing the application of complex materials on said surface.

2. The method of claim 1, further comprising:

providing on the display of the computing device user interface elements allowing a user to apply at least one makeup product to a virtual canvas;

modifying at least the normal map, the diffuse color layer, or the specular color layer in response to the user applying the at least one makeup product to the virtual canvas.

3. The method of claim 1, wherein computing the diffuse light intensity comprises:

retrieving a normal vector N for the point from the normal map;

determining a vector L indicating the direction of a light source;

computing a dot product of N and L.

4. The method of claim 1, wherein computing the specular light intensity comprises:

retrieving a normal vector N for the point from the normal map;

determining a vector L indicating the direction of a light source;

determining a vector V indicating the direction of an observer;

computing a vector H, where H=(L+V)/2;

computing a dot product D of N and H; and computing D to the power of S, where S is a predetermined value, wherein L+V does not equal zero.

5. The method of claim 4 wherein the direction of the observer is centered on the display of the computing device, at a fixed distance.

6. The method of claim 4, wherein the direction of the light source is selectable by a user.

7. The method of claim 4, wherein the direction of the light source is determined by a gyroscope of the computing device.

8. The method of claim 4, wherein the direction of the light source is determined by an accelerometer of the computing device.

9. The method of claim 2, wherein the at least one makeup product is selected from the group consisting of glitter, foundation, illuminator, powder, gloss, concealer, blush, eye pencils, mouth pencils, kajal, lipstick cream, lipstick matte, lipstick frosty, shadow, and outliner.

10. A computing device, comprising:

memory;

a display;

a processor;

wherein the processor, the memory, and the display cooperate to:

maintain, in the memory, a normal map, the normal map comprising a two-dimensional array of normal vectors;

maintain, in the memory, a diffuse color layer, the diffuse color layer comprising a first two-dimensional array of colors;

maintain, in the memory, a specular color layer, the specular color layer comprising a second two-dimensional array of colors;

for each point of a surface comprising a plurality of points on said surface illuminated by a light source:

compute a diffuse light intensity based on the normal map at each point;

compute a specular light intensity based on the normal map at each point;

compute a color for each point by adding the diffuse color for each point multiplied by the diffuse light intensity and the specular color for each point multiplied by the specular light intensity; and display the color on pixels of the display corresponding to each point.

11. A non-transitory computer-readable medium having stored thereon executable code for execution by a processor of a computing device, the executable code comprising instructions for:

maintaining, in a memory of the computing device, a normal map, the normal map comprising a two-dimensional array of normal vectors;

maintaining, in the memory of the computing device, a diffuse color layer, the diffuse color layer comprising a first two-dimensional array of colors;

maintaining, in the memory of the computing device, a specular color layer, the specular color layer comprising a second two-dimensional array of colors;

for each point of a surface comprising a plurality of points on said surface illuminated by a light source:

computing a diffuse light intensity based on the normal map at each point;

computing a specular light intensity based on the normal map at each point;

computing a color for the point by adding the diffuse color for each point multiplied by the diffuse light intensity and the specular color for each point multiplied by the specular light intensity; and displaying the color on pixels of a display of the computing device corresponding to each point.

* * * * *